June 14, 1955    L. M. FRANCIS    2,710,768
TRAILER FOR TRANSPORTING AUTOMOBILES AND GENERAL FREIGHT
Filed March 28, 1949    4 Sheets-Sheet 1
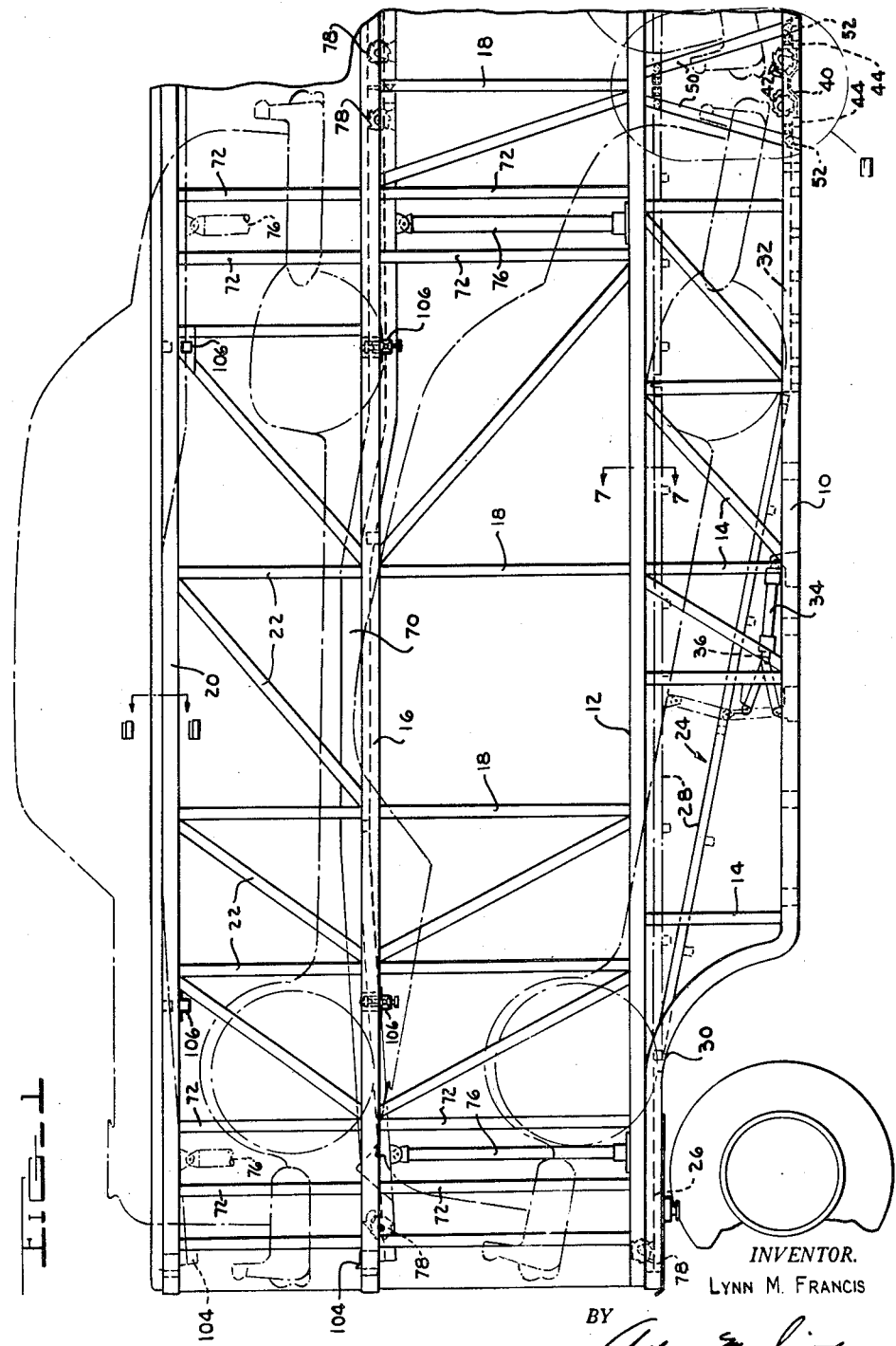
INVENTOR.
LYNN M. FRANCIS
BY
ATTORNEY

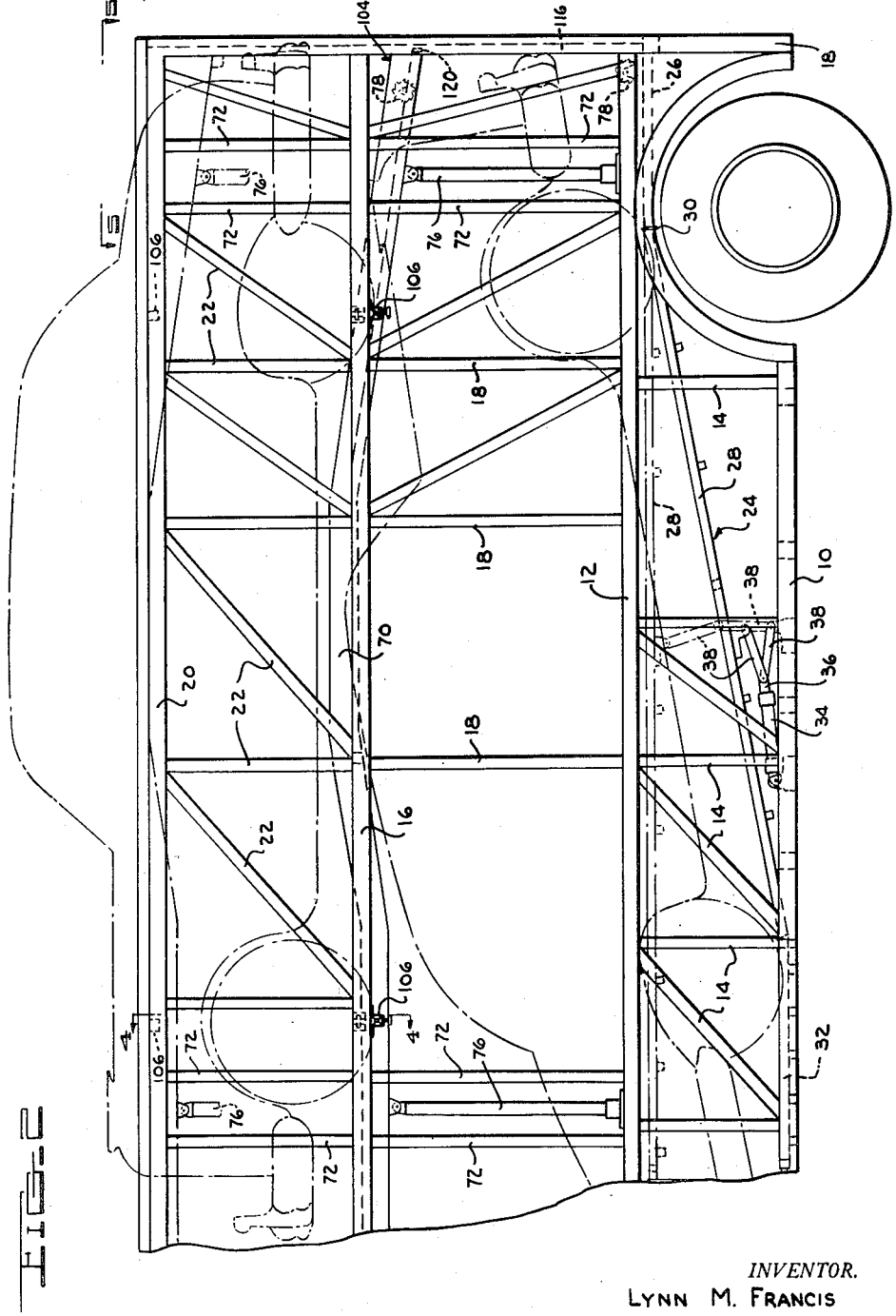

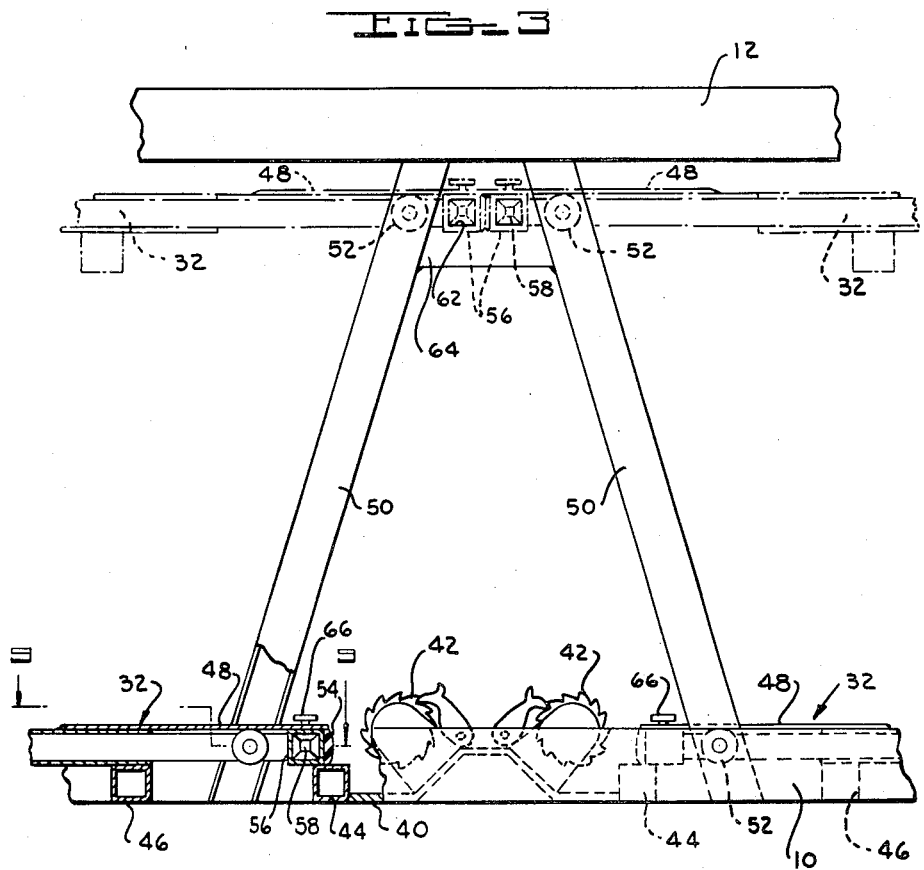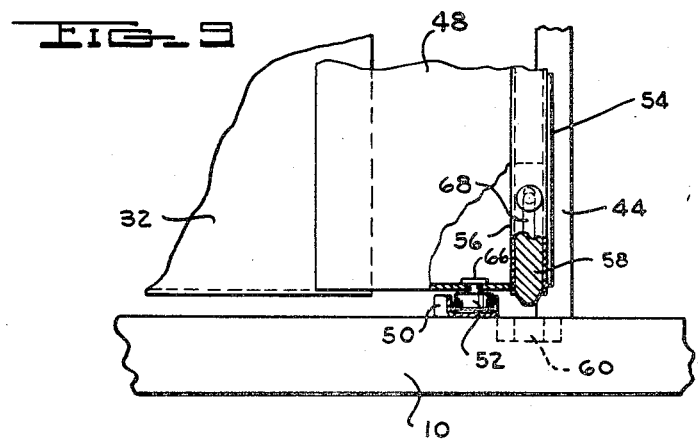

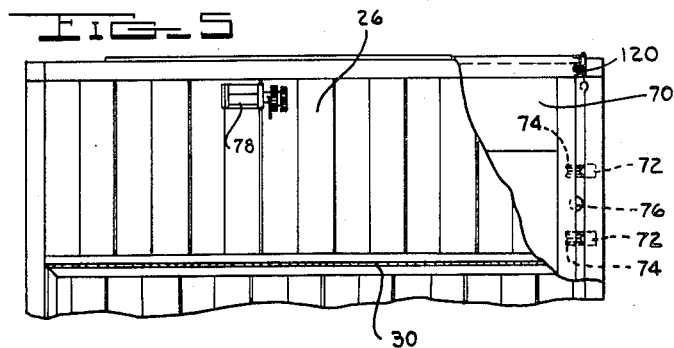
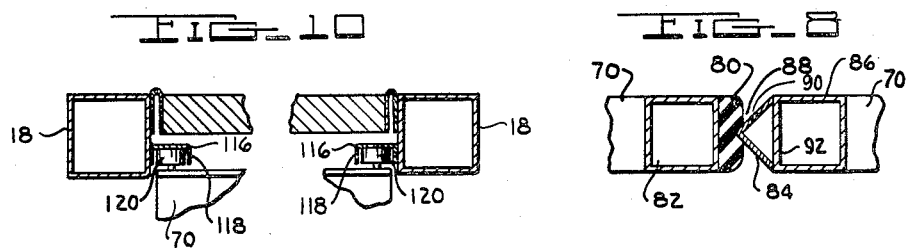
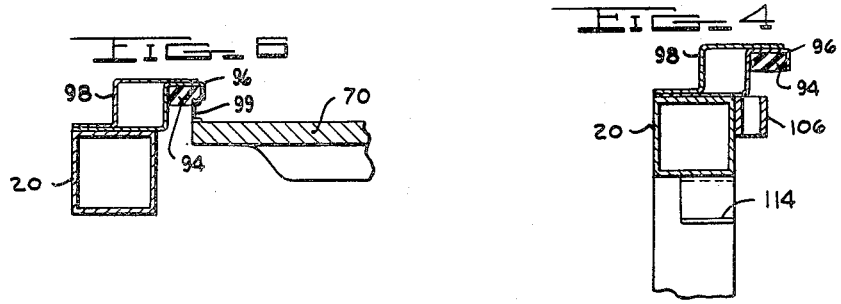

United States Patent Office 2,710,768
Patented June 14, 1955

2,710,768

TRAILER FOR TRANSPORTING AUTOMOBILES AND GENERAL FREIGHT

Lynn M. Francis, Detroit, Mich.

Application March 28, 1949, Serial No. 83,950

1 Claim. (Cl. 296—1)

This invention relates to a transportation vehicle and more particularly to a vehicle of the trailer type constructed and arranged to be converted from an automobile hauling trailer to a cargo hauling trailer.

Automobile hauling trailers or vehicles have usually been made of open frame work construction for supporting assembled automobiles, the latter being exposed to the elements. While these vehicles are satisfactory for hauling automobiles, they are not entirely satisfactory for hauling freight because the latter requires more protection in transit than is required by automobiles. Consequently, it is necessary to weatherproof the vehicle and at the same time adapt it for maximum cargo hauling space which is also readily accessible for loading and unloading.

The trailer herein illustrated is of the convertible type adapted for use in hauling automobiles or the like and by simple conversion adapted to provide a closely sealed cargo compartment which can be used in hauling freight where the same is to be protected against the elements.

The present application is a continuation in part of my co-pending application, Serial No. 46,859 which issued into Patent No. 2,611,640 on September 23, 1952.

It is an important object of the present invention to provide a body of frame construction having closed side wall sections, a movable floor section and a movable roof section, and to provide novel sealing means between these movable parts whereby an open trailer, such as used for hauling automobiles, when converted, provides a sealed body enclosure for hauling cargo.

Another object of the invention is to provide extensible and retractable portions in a movable floor section which are positively positioned from an open position to a sealed position when the floor is adjusted to its position for use as a cargo hauling trailer.

A further object of the invention is to provide novel sealing means between vertically movable sections, such as floor and roof sections, and side wall sections, as well as to provide a seal between relatively movable swinging parts.

A still further object of the present invention is to provide a movable cross-tie between oppositely disposed wall sections for obtaining rigidity of parts during hauling and to permit free access to the trailer during loading.

Other objects and advantages of the invention will more fully appear from the following description taken in connection with the accompanying drawings in which:

Fig. 1 is a side elevational view of the front portion of the improved trailer, the side paneling being omitted to more clearly show the construction and arrangement of parts.

Fig. 2 is a view corresponding to Fig. 1, but showing the rear portion of the trailer.

Fig. 3 is an enlarged fragmentary sectional view of the floor section, taken in the area indicated by the dot and dash lines A on Fig. 1; the floor being shown in full lines in its position for hauling automobiles and in dotted lines for hauling freight.

Fig. 4 is a cross sectional view taken on line 4—4 of Fig. 2.

Fig. 5 is a fragmentary top plan view of the rear end portion of the trailer, parts being broken away to show the track members for the upper platform for guiding the latter during its vertical movement.

Fig. 6 is an enlarged fragmentary sectional view taken on line 6—6 of Fig. 1 with the upper floor in its raised position.

Fig. 7 is an enlarged fragmentary sectional view on line 7—7 of Fig. 1 showing the lower floor sealing means with the side wall.

Fig. 8 is an enlarged fragmentary sectional view of the joint between the upper floor, showing a seal and drain construction, taken in the area of the dot and dash lines B, Fig. 1.

Fig. 9 is a fragmentary top plan view of Fig. 3, showing positioning and locking means for the movable lower floor section.

Fig. 10 is a fragmentary top plan view, parts being broken away and in section showing a movable cross-tie construction between the upper floor and the side wall section.

While one embodiment of the invention is illustrated in the drawings, generally speaking the trailer comprises a paneled frame construction having a drop center lower floor and an upper floor which is vertically movable, relative to the lower floor, into a position for supporting automobiles or a position forming the roof of the trailer.

In Figs. 1 and 2, I have illustrated front and rear side elevational views of a trailer frame structure, the side wall paneling having been removed for the purpose of more clearly showing the interior construction.

The cargo trailer comprises a bottom 10 suspended on a lower frame 12 by vertical and diagonal rails 14. A central frame 16 is supported on the lower frame by rails 18 and an upper frame 20 is supported by rails 22. The frames and rails are covered with a suitable covering such as light weight sheet metal, which is preferably corrugated to provide additional reenforcement.

The lower floor 24 has fixed end sections 26 in the plane of the frame 12; sections 28 hinged to the fixed sections 26 as at 30; and the intermediate sections 32 which are hinged to the free ends of the sections 28. The intermediate sections 32 are adapted to be positioned in the plane of the bottom 10 or the plane of the lower frame 12. I have shown hydraulic jack cylinders 34 pivotally supported on the bottom 10. In each cylinder a piston 36 is connected to links 38 which are connected respectively to the floor section 24 and the bottom 10. The hydraulic cylinders and pistons are adapted for raising and lowering the floor sections; the links moving to an over-center position, as shown by the dot and dash lines, for locking the floor in its raised position.

The action of the floor sections can be more clearly seen in Fig. 3. A transverse cross member 40 extends between the longitudinal frame members of the bottom 10 and receives hold down devices 42 for securing the automobiles in position. Cross members 44 and 46 are arranged between the frame members of the bottom 10 for supporting the adjacent ends of the intermediate floor sections 32 when the latter is in its lowered position. The adjacent ends of the intermediate floor sections 32 are provided with sliding end portions 48 which rest on the cross members 44, the floor section 32 resting on the cross members 46.

A pair of upwardly converging track members 50 extend generally in a vertical direction from the bottom 10 to the lower frame 12. These tracks are channel shaped and receive rollers 52 carried by the sliding end portions 48. As the floor sections 32 are moved upwardly to the raised position, the converging tracks 50, cooperating with the rollers 52, draw the sliding end sections inwardly to a closed position, as indicated by the dot and dash lines at the upper portion of Fig. 3. The adjacent edges of the sliding ends 48 are provided with a compressible sealing means 54 such as rubber which may be cemented to the faces of the sliding ends. This provides a tight seal between the movable and separable floor sections when in the raised position.

The adjacent ends of the sliding ends are further provided with tubular members 56, the opposite ends of which slidingly receive lock bolts 58 for entering openings 60 in the bottom 10 when in the lowered position and openings 62 formed in a gusset plate 64 between the tracks 50. Manipulating members 66 attached to the bolts 58 are guided in slots 68 for moving the bolts.

An upper floor 70 is preferably made in front and rear sections. This floor is vertically movable between the side walls of the trailer from an automobile hauling position to a roof position for closing the vehicle when used as a freight hauling trailer. In Figs. 1 and 2 the floor 70 is shown in its freight hauling position in full lines and in dot and dash lines in its roof position.

A pair of vertically extending guides 72, extending between the frames 12, 16 and 20 are arranged at the opposite ends of the trailer side walls and at the center so that guides are provided for the opposite ends of each of the upper floor sections. Rollers 74, see Fig. 5, carried by the floor, are adapted to engage the guides for directing floor movement. Hydraulic cylinder and piston constructions 76 are arranged between the bottom 10 and floor 70 for raising the floor and operating in the manner usual in hydraulic cylinders. Four cylinders have been shown and arranged between each pair of guides 72. Each upper floor section is provided with a central ramp or raised portion for assisting in positioning an automobile in location. Hold down devices are illustrated at 78.

The adjacent edges of the two sections of the floor 70 are sealed so that when the floor is in the roof position a weather-tight joint is provided. Fig. 8 illustrates a seal in which a rubber strip 80 is secured to a tubular member 82, at the end of one section. A rigid V-shaped flange 84 is secured to a tubular member 86 on the end of the other floor section 70 adapted to have a knife edge contact with the outer surface of the rubber strip, 80. This provides a gutter 88 at the upper surface of the abutting ends for collecting water. Openings 90 are provided in the flange 84 to drain water into the tubular member 86 through openings 92 where it is directed laterally to the side edges of the trailer walls. It will be seen that this sealing feature furnishes both a moisture-tight and a dust-tight seal and eliminates a canvas covering heretofore commonly used.

In Fig. 6 I have shown the sealing construction between the side walls and upper floor 70 when the latter is in the raised position and serving as a roof structure. In order to raise and lower the upper floor, it is necessary to provide a clearance and also to provide a stop for the floor in the raised position. This construction comprises a block 94 of compressible rubber, such as sponge rubber, or the like, which is fixed to a metal channel member 96, extending longitudinally of the frame 20.

The metal channel is carried by the frame 20 and conforms to the irregular shape of the ramped floor sections 70. An outer sheet 98 is provided to close the outer surface between the frame 20 and the channel. A flange 99 carried by the floor section 70 is adapted to be pressed into the rubber block 94 when the floor is in raised position.

In all four of the hinged connections for the lower floor sections I have shown piano hinges 30, more clearly shown in Fig. 5. This construction provides a tight hinge so that when the floor is in the raised position for freight hauling, it is possible to have a dirt-tight floor.

Fig. 7 illustrates the sealed connection between the side walls and the hinged sections 28 and 32 of the lower floor 24. Here again it is necessary to provide lateral clearance for the moving sections to permit vertical movement and to provide a seal when the floor is in its raised position for a freight hauling trailer. A resilient member 100, such as sponge rubber, is carried by a flanged backing member 102 secured to the inner surface of the frame 12. The backing member and resilient member are so dimensioned and positioned relative to the trailer frame that the cracks between the floor and the side frames of the trailer are completely sealed when the floor sections are in the raised position.

The front and rear wall panels are likewise sealed with the upper floor when it is raised to its roof position. This is indicated by the members 104 in Fig. 1.

Locating sockets 106 carried by the frame members 12 and 20, Fig. 4, are spaced longitudinally of the trailer frame. The floor 70 is provided with an arm 108 which carries semi-spherical projections 110 at its opposite faces which are adapted to be located in one of the sockets 106 in either the raised or lowered position, thus properly locating the floor in its automobile hauling position or its roof position. Slide bars 112, carried by the floor 70 are adapted to be received in one or the other of apertured brackets 114 adjacent the frames 12 and 20 respectively. If desired, these sliding bars may be substituted by mechanical bolt and nut locking devices for holding the floor in its selected position.

In Fig. 10 I have illustrated a cross-tie mechanism between the vertical frame members at the rear of the trailer. Since a swinging door, or a pair of swinging doors herein illustrated weakens the stability between the side walls, I have provided a support between the side walls, which is carried by the movable floor. Tracks 116 are secured to the vertical frames 18. These tracks are channel members having inner flanges 118 which guide rollers 120 carried by the upper floor 70. These rollers 120 fixed to the movable floor 70 and guided in the tracks 116 prevent the springing apart of the side wall sections. The end pillars, frames 18, are definitely tied together by the upper floor section, either in its automobile carrying position or its roof position.

It will be seen that I have provided a trailer having floor sections which may be positioned for conveniently hauling automobiles and which may be moved to form a closed compartment for hauling freight and the like. The moving parts are provided with sealing means which are moisture-tight and dust-tight, thereby providing a completely sealed compartment when the upper floor is in the raised position serving as a roof section.

While I have illustrated and described a preferred embodiment of the invention, it will be understood that various changes including the size, shape, and arrangement of parts may be made without departing from the spirit of my invention and it is not my intention to limit its scope other than by the terms of the appended claim.

Having thus described my invention, I claim:

A cargo trailer adapted for hauling either automobiles or freight, comprising a frame structure, a bottom carried by said frame, fixed floor sections positioned at the front and rear of said trailer above said bottom, a pair of swinging floor sections, one hinged to the inner edge of each of said fixed sections, intermediate sections hinged to the free end of each of the swinging sections movable in a vertical plane and telescoping portions provided on the adjacent edges of said intermediate sections to allow separation between the edges thereof when the floor sections are in their lowered positions with the intermediate sections disposed on said floor, a pair of converging guide members extending upwardly from said bottom on each side of the telescoping portions adjacent the ends thereof and rollers affixed to the outer edges of said telescoping portions and movable in said guide members so that as the said intermediate sections are moved in a vertical plane the adjacent edges of the telescoping portions move in a horizontal plane toward or away from each other and sealing means cooperating between the adjacent edges of said telescoping portions when the movable floor sections are in their raised position.

References Cited in the file of this patent

UNITED STATES PATENTS

| | | |
|---|---|---|
| 124,625 | Rank | Mar. 12, 1872 |
| 179,716 | Metz | July 11, 1876 |
| 1,016,220 | Evens | Jan. 30, 1912 |
| 1,229,714 | Clark et al. | June 12, 1917 |
| 1,247,553 | Linquist et al. | Nov. 20, 1917 |
| 1,428,748 | Brososky | Sept. 12, 1922 |
| 1,925,665 | Judd et al. | Sept. 5, 1933 |
| 2,263,806 | Hammerl | Nov. 25, 1941 |
| 2,274,668 | Crawford | Mar. 3, 1942 |
| 2,327,541 | Matheny | Aug. 24, 1943 |
| 2,385,115 | Stuart | Sept. 18, 1945 |
| 2,408,132 | Weeks | Sept. 24, 1946 |
| 2,461,927 | Schaldach | Feb. 15, 1949 |
| 2,492,829 | Baker | Dec. 27, 1949 |
| 2,498,851 | Doty | Feb. 28, 1950 |
| 2,520,698 | Sniezyk | Aug. 29, 1950 |
| 2,611,640 | Francis | Sept. 23, 1952 |

FOREIGN PATENTS

| | | |
|---|---|---|
| 295,736 | Great Britain | 1927 |